US012756836B2

(12) United States Patent
Kalva et al.

(10) Patent No.: US 12,756,836 B2
(45) Date of Patent: Oct. 6, 2026

(54) SYSTEMS AND METHODS FOR MOTION INFORMATION TRANSFER FROM VISUAL TO FEATURE DOMAIN AND FEATURE-BASED DECODER-SIDE MOTION VECTOR REFINEMENT CONTROL

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 123 days.

(21) Appl. No.: 18/652,046

(22) Filed: May 1, 2024

(65) Prior Publication Data

US 2024/0291999 A1 Aug. 29, 2024

Related U.S. Application Data

(63) Continuation of application No. PCT/US2022/048376, filed on Oct. 31, 2022.

(60) Provisional application No. 63/275,923, filed on Nov. 4, 2021, provisional application No. 63/275,912, filed on Nov. 4, 2021.

(51) Int. Cl.

| | |
|---|---|
| ***H04N 19/65*** | (2014.01) |
| ***H04L 65/70*** | (2022.01) |
| ***H04L 65/80*** | (2022.01) |
| ***H04N 19/12*** | (2014.01) |
| ***H04N 19/13*** | (2014.01) |
| ***H04N 19/139*** | (2014.01) |
| ***H04N 19/157*** | (2014.01) |
| ***H04N 19/172*** | (2014.01) |
| ***H04N 19/176*** | (2014.01) |
| ***H04N 19/60*** | (2014.01) |
| ***H04N 19/70*** | (2014.01) |

(52) U.S. Cl.

CPC ........... *H04N 19/139* (2014.11); *H04N 19/12* (2014.11); *H04N 19/157* (2014.11); *H04N 19/172* (2014.11); *H04N 19/60* (2014.11); *H04N 19/70* (2014.11)

(58) Field of Classification Search

CPC ...... H04N 19/48; H04N 19/176; H04N 19/65; H04N 19/60; H04N 19/82; H04N 19/13; H04L 65/80; H04L 65/70

See application file for complete search history.

(56) References Cited

U.S. PATENT DOCUMENTS

| | | | | |
|---|---|---|---|---|
| 2011/0228854 | A1* | 9/2011 | Shin | H04N 19/176 375/E7.125 |
| 2016/0309180 | A1* | 10/2016 | Nakamura | H04N 19/176 |
| 2019/0094027 | A1* | 3/2019 | Xu | G01C 21/1656 |
| 2020/0126186 | A1* | 4/2020 | Kim | H04N 19/46 |
| 2020/0302187 | A1* | 9/2020 | Wang | G06V 20/52 |

(Continued)

*Primary Examiner* — Neil R Mikeska

(74) *Attorney, Agent, or Firm* — OP Solutions IP Department; Paul Ackerman

(57) ABSTRACT

Systems and methods for motion information transfer from visual to feature domain are disclosed which provide for mapping motion information from coding units in video content to corresponding convolution unit(s) in feature content. Systems and methods are also provided for improved decoder-side motion vector refinement of video content based on characteristics of corresponding feature units.

7 Claims, 13 Drawing Sheets

(56) References Cited

U.S. PATENT DOCUMENTS

| | | | | |
|---|---|---|---|---|
| 2022/0191553 | A1* | 6/2022 | Auyeung | H04N 19/82 |
| 2022/0215540 | A1* | 7/2022 | Weiss | A61B 5/0033 |

* cited by examiner

Video picture divided into coding units

Feature picture composed from the convolutional units

SYSTEMS AND METHODS FOR MOTION INFORMATION TRANSFER FROM VISUAL TO FEATURE DOMAIN AND FEATURE-BASED DECODER-SIDE MOTION VECTOR REFINEMENT CONTROL

CROSS-REFERENCE TO RELATED APPLICATIONS

The present application is a continuation of International Application PCT/US2022/048376, filed on Oct. 31, 2022, and entitled SYSTEMS AND METHODS FOR MOTION INFORMATION TRANSFER FROM VISUAL TO FEATURE DOMAIN AND FEATURE-BASED DECODER-SIDE MOTION VECTOR REFINEMENT CONTROL, which application claims the benefit of priority to U.S. Provisional Application Ser. No. 63/275,912 filed on Nov. 4, 2021 and entitled Systems and Methods for Motion Information Transfer from Visual to Feature Domain and also claims the benefit of priority to U.S. Provisional Application Ser. No. 63/275,923 filed on Nov. 4, 2021 and entitled Systems and Methods for Feature-based Decoder-side Motion Vector Refinement Control, the disclosures of which are hereby incorporated by reference in their entireties.

FIELD OF THE INVENTION

The present disclosure generally relates to the field of video encoding and decoding. In particular, the present disclosure is directed to systems and methods for motion information transfer from visual to feature domain and feature-based decoder-side motion vector refinement control.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

Recent trends in robotics, surveillance, monitoring, Internet of Things, etc. introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics. Further improving encoding and decoding of video for consumption by machines and in hybrid systems in which video is consumed by both a human viewer and a machine is, therefore, of growing importance in the field.

SUMMARY OF THE DISCLOSURE

A method of encoding video content with feature information is provided. The encoding includes determining motion information for each coding unit comprising the video content. A feature map is generated for the video content, the feature map having a plurality of convolution units with a correspondence to the convolution units. Using a transformation selected based on the correspondence of the convolution units to the coding units, the encoding method generates motion transformation information by mapping the motion information of the video content in each coding unit to at least one corresponding convolution unit and generates an encoded bitstream including the video content, the motion information, and the motion transformation information.

A number of transformations are provided and may depend on the nature of the correspondence between coding units and convolution units. For example, if the coding units correspond to the convolution units in size and number and wherein the transformation copies the motion information from each coding unit to a corresponding convolution unit. Alternatively, if the coding units correspond to the convolution units in number but differ in size the transformation scales the motion information from each coding unit to a corresponding convolution unit. In the case where multiple coding units correspond to a single convolution unit the transformation may fuse the motion information of the multiple coding units to map the motion to the convolution unit. Additionally, if each coding unit corresponds to multiple convolution units the transformation merges the motion information from a coding unit to the multiple convolution units. In one embodiment, the transformation is selected from a group including copying, scaling, fusing and merging.

The bitstream can include header and metadata for the entire content, as well as a video sub-bitstream including header, metadata, and video payload information including motion information and a feature sub-bitstream including header, metadata and feature payload information including motion transform information.

A decoder and decoding method for decoding a bitstream with feature enhanced decoder-side motion vector refinement is also provided. The bitstream can include video content comprising a plurality of coding units having associated motion vectors and feature content comprising a plurality of feature units encoded in the bitstream, the encoder having a mode for decoder-side motion vector refinement (DMVR). The decoding method includes, for each feature unit, determine if the feature unit includes an object of interest. For a coding unit corresponding to the feature unit, determine if the DMVR mode is enabled. If the feature unit includes an object of interest and the DMVR mode for the corresponding coding unit is not enabled, enable the DMVR mode for that coding unit. If the feature unit does not include an object of interest and the DMVR mode for the corresponding coding unit is enabled, disable the DMVR mode for that coding unit.

Preferably, the status of the DMVR mode for each coding unit is signaled in the bitstream. For example, the DMVR mode can be signaled in a picture header of the bitstream, in a sequence parameter set of the bitstream.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a schematic diagram, further comprising FIG. 6A-6D, illustrating exemplary transformations to motion vectors, in which:

FIG. 6A illustrates a copying transformation;

FIG. 6B illustrates a scaling transformation;

FIG. 6C illustrates a fusion transformation; and

FIG. 6D illustrates a merging transformation;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
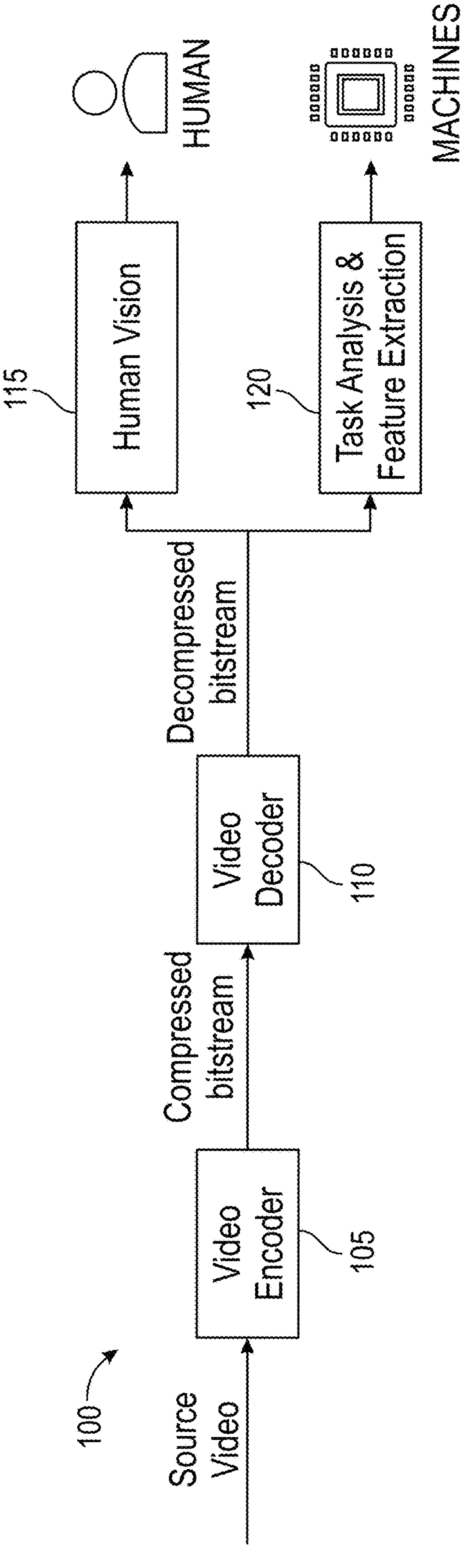
FIG. 1 is a block diagram illustrating an exemplary embodiment of a video coding system.

In many applications, such as surveillance systems with multiple cameras, intelligent transportation, smart city applications, and/or intelligent industry applications, traditional video coding may require compression of large number of videos from cameras and transmission through a network to machines and for human consumption. Subsequently, at a machine site, algorithms for feature extraction may applied typically using convolutional neural networks or deep learning techniques including object detection, event action recognition, pose estimation and others. FIG. 1 shows an exemplary embodiment of a standard video encoding and decoding system, such as a VVC-based coding system, applied for machines. Using a conventional approach unfortunately may require a massive video transmission from multiple cameras, which may take significant time for efficient and fast real-time analysis and decision-making. A VCM approach as disclosed herein may resolve this problem by both encoding video and extracting some features at a transmitter site and then transmitting a resultant encoded bit stream to a VCM decoder. As used herein, the term VCM is not limited to a specific proposed protocol but more generally includes all systems for coding and decoding video for machine consumption.

At a decoder site it will be appreciated that video may be decoded for human vision and features may be decoded for machines. Systems which provide video for both human vision and for machine consumption are sometimes referred to as hybrid systems. The systems and methods disclosed herein are intended to apply to machine-based systems as well as hybrid systems.

The present disclosure presents embodiments of methods and systems for motion information transfer from the visual to the feature domain in the joint video-feature encoder and decoder, one example of which is the VCM encoder and decoder.

Embodiments of a system that supports the present methods is depicted in the high-level block diagrams in FIGS. 1-2 below.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption.

Figure 2:
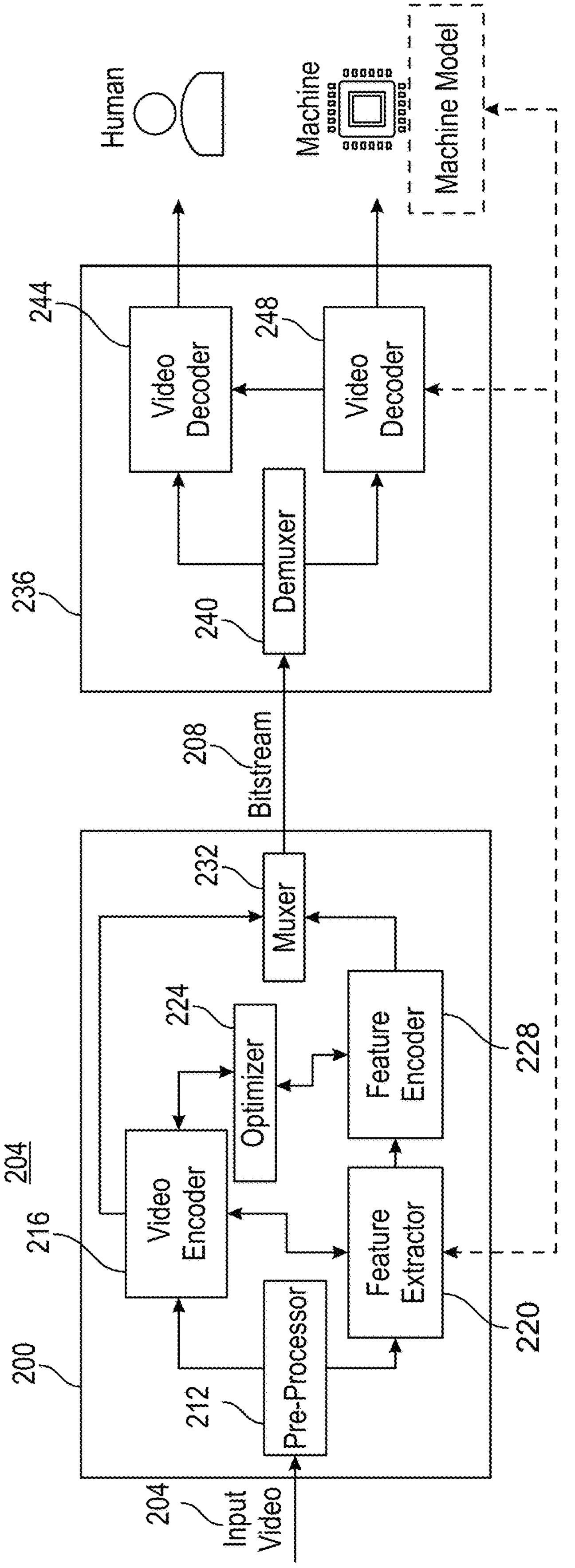
FIG. 2 is a block diagram illustrating an exemplary embodiment of a video coding for machines system.

Referring now to FIG. 2, an exemplary embodiment of encoder for video coding for machines (VCM) is illustrated.

VCM encoder 200 may be implemented using any circuitry including without limitation digital and/or analog circuitry; VCM encoder 200 may be configured using hardware configuration, software configuration, firmware configuration, and/or any combination thereof. VCM encoder 200 may be implemented as a computing device and/or as a component of a computing device, which may include without limitation any computing device as described below. In an embodiment, VCM encoder 200 may be configured to receive an input video 204 and generate an output bitstream 208. Reception of an input video 204 may be accomplished in any manner described below. A bitstream may include, without limitation, any bitstream as described below.

VCM encoder 200 may include, without limitation, a pre-processor 212, a video encoder 216, a feature extractor 220, an optimizer 224, a feature encoder 228, and/or a multiplexor 232. Pre-processor 212 may receive input video 204 stream and parse out video, audio and metadata substreams of the stream. Pre-processor 212 may include and/or communicate with decoder as described in further detail below; in other words, Pre-processor 212 may have an ability to decode input streams. This may allow, in a non-limiting example, decoding of an input video 204, which may facilitate downstream pixel-domain analysis.

Further referring to FIG. 2, VCM encoder 200 may operate in a hybrid mode and/or in a video mode; when in the hybrid mode VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 212.

Still referring to FIG. 2, video encoder 216 may include without limitation any video encoder 216 as described in further detail below or otherwise known in the art to encode video using a known encoding standard such as HEVC, AV1, VVC and the like. When VCM encoder 200 is in hybrid mode, VCM encoder 200 may send unmodified input video 204 to video encoder 216 and a copy of the same input video 204, and/or input video 204 that has been modified in some way, to feature extractor 220. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 216 and feature extractor 220 can be connected and might exchange useful information in both directions. For example, and without limitation, video encoder 216 may transfer motion estimation information to feature extractor 220, and vice-versa. Video encoder 216 may provide Quantization mapping and/or data descriptive thereof based on regions of interest (ROI), which video encoder 216 and/or feature extractor 220 may identify, to feature extractor 220, or vice-versa. Video encoder 216 may provide to feature extractor 220 data describing one or more partitioning decisions based on features present and/or identified in input video 204, input signal, and/or any frame and/or subframe thereof; feature extractor 220 may provide to video encoder 216 data describing one or more partitioning decisions based on features present and/or identified in input video 204, input signal, and/or any frame and/or subframe thereof. Video encoder 216 feature extractor 220 may share and/or transmit to one another temporal information for optimal group of pictures (GOP) decisions. Each of these techniques and/or processes may be performed, without limitation, as described in further detail below.

With continued reference to FIG. 2, feature extractor 220 may operate in an offline mode or in an online mode. Feature extractor 220 may identify and/or otherwise act on and/or manipulate features. A “feature,” as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 228 is configured for encoding a feature signal, for instance and without limitation as generated by feature extractor 220. In an embodiment, after extracting the features feature extractor 220 may pass extracted features to feature encoder 228. Feature encoder 228 may use entropy coding and/or similar techniques, for instance and without limitation as described below, to produce a feature stream, which may be passed to multiplexor 232. Video encoder 216 and/or feature encoder 228 may be connected via optimizer 224; optimizer 224 may exchange useful information between those video encoder 216 and feature encoder 228. For example, and without limitation, information related to codeword construction and/or length for entropy coding may be exchanged and reused, via optimizer 224, for optimal compression.

In an embodiment, and continuing to refer to FIG. 2, video encoder 216 may produce a video stream; video stream may be passed to multiplexor 232. Multiplexor 232 may multiplex video stream with a feature stream generated by feature encoder 228; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder 200 may use video encoder 216 for both video and feature encoding. Feature extractor 220 may transmit features to video encoder 216; the video encoder 216 may encode features into a video stream that may be decoded by a corresponding video decoder 244. It should be noted that VCM encoder 200 may use a single video encoder 216 for both video encoding and feature encoding, in which case it may use different set of parameters for video and features; alternatively, VCM encoder 200 may two separate video encoder 216*s*, which may operate in parallel.

Still referring to FIG. 2, system 200 may include and/or communicate with, a VCM decoder 236. VCM decoder 236 and/or elements thereof may be implemented using any circuitry and/or type of configuration suitable for configuration of VCM encoder 200 as described above. VCM decoder 236 may include, without limitation, a demultiplexor 240. Demultiplexor 240 may operate to demultiplex bitstreams if multiplexed as described above; for instance and without limitation, demultiplexor 240 may separate a multiplexed bitstream containing one or more video bitstreams and one or more feature bitstreams into separate video and feature bitstreams.

Continuing to refer to FIG. 2, VCM decoder 236 may include a video decoder 244. Video decoder 244 may be implemented, without limitation in any manner suitable for a decoder as described in further detail below. In an embodiment, and without limitation, video decoder 244 may generate an output video, which may be viewed by a human or other creature and/or device having visual sensory abilities.

Still referring to FIG. 2, VCM decoder 236 may include a feature decoder 248. In an embodiment, and without limitation, feature decoder 248 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IOT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 200 and/or VCM decoder 236 may be designed and/or configured to perform any method, method step, or sequence of method steps in any embodiment described in this disclosure, in any order and with any degree of repetition. For instance, each of VCM encoder 200 and/or VCM decoder 236 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 200 and/or VCM decoder 236 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As seen in FIG. 2, the encoder can split the input video signal into two streams-video (visual) stream and a feature stream. Subsequently, both streams may be encoded using separate instances of video encoders that are connected and can share information. This connection can be utilized to optimize the encoding process as well as remove redundancies in the output bitstream.

The visual and feature streams share the statistical properties of the input. While the visual representation in the feature space might not contain same level of the spatial and temporal details as the video stream for human use, it still broadly contains the same content, albeit at possibly different resolution or modality. One of the characteristics of the input content that is typically shared between the visual and feature representations is the motion information. Motion estimation, however, tends to be a complex part of the video encoding process and performing motion estimation in both video encoders greatly increases complexity and power usage of the system.

Since the motion estimation that is performed by the video encoder on a full-resolution video signal is close to the true optical flow of the input pixels, it can be re-used by the feature video encoder with proper mapping and appropriate modifications.

An example of such motion information transfer between the video encoder and the features represented as feature maps which can be produced by a Convolutional Neural Network (CNN). It will be appreciated that the present methods of the motion transfer are not limited to the following example but can be applied more generally to any use case where input video and the feature representation of that video share visual characteristics.

Figures 3A, 3B, 3C:
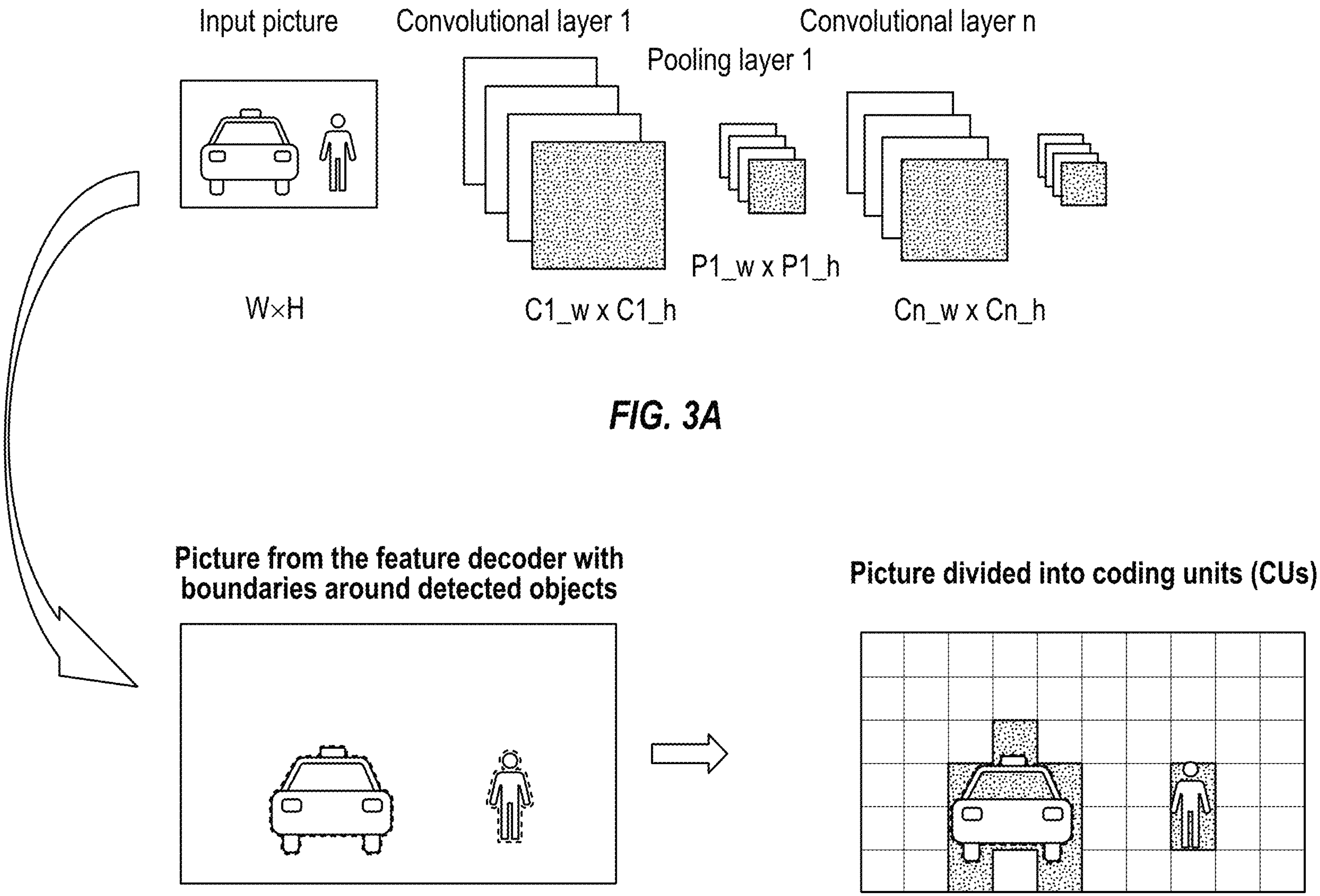
FIG. 3A is a schematic diagram illustrating an exemplary embodiment of a typical representation of the CNN with some layers.
FIGS. 3B and 3C pictorially represent the input image of FIG. 3A in which object boundaries are identified and further illustrating that picture represented at a coding unit level, respectively.
Figure 4:
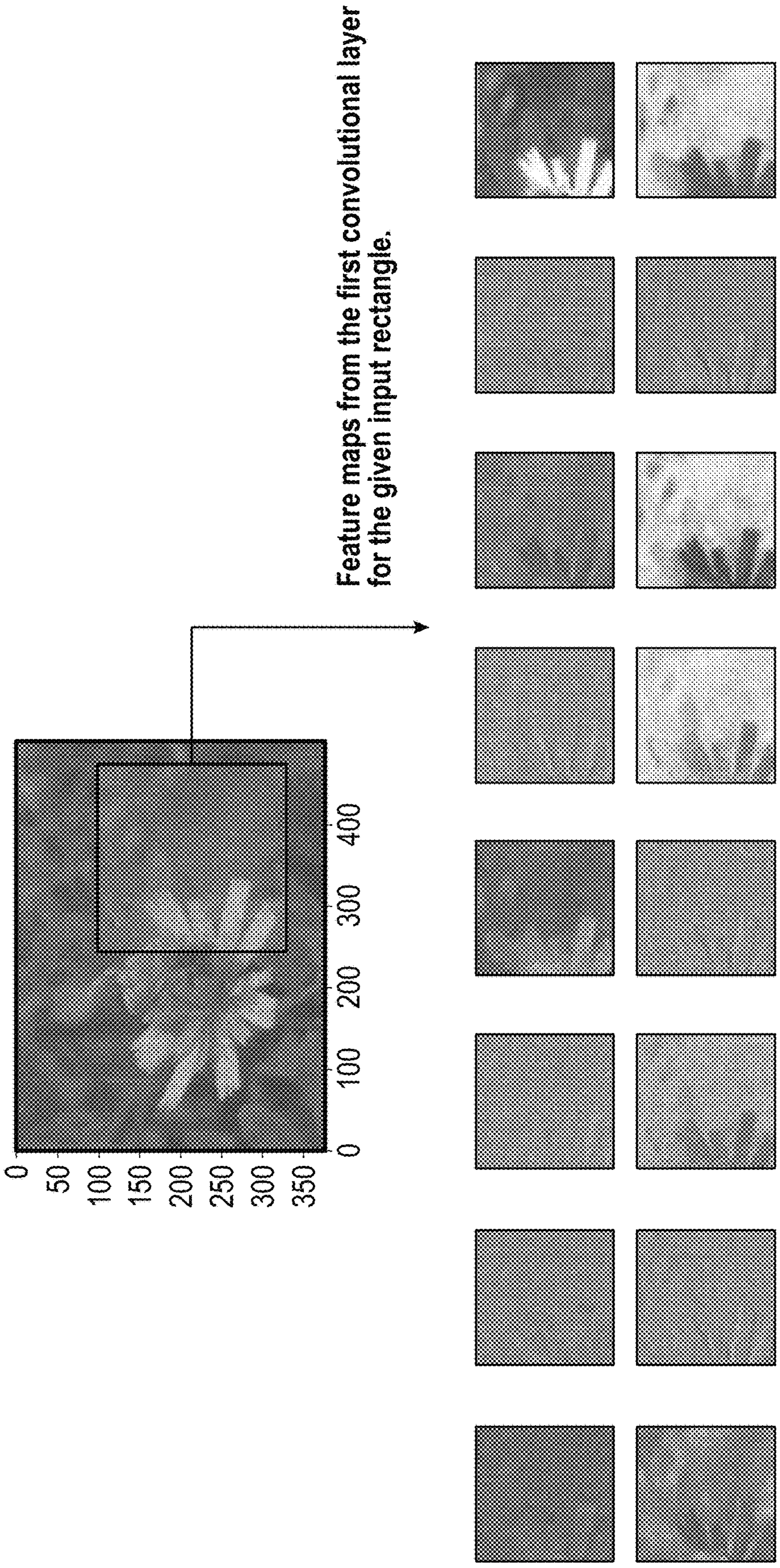
FIG. 4 is an exemplary illustration of an input picture and a set of feature maps.

FIG. 3A is a schematic representation of an exemplary embodiment of a CNN architecture. The CNN takes the input picture and passes it through the series of layers. Layers are usually stacked such that the operations of convolution and pooling are conducted in consecutive layers, e.g., a convolution layer followed by a pooling layer. A CNN can have arbitrary number of such layers. The output of a convolutional layer is called a feature map. One example of the input picture and a set of feature maps is given in FIG. 4

The video encoder takes as input full resolution video and performs motion estimation on sub-units of the picture known as coding units, as illustrated for example in FIG. 3C. For each coding unit the encoder will find the best matching motion vector that is used to designate displacement of the best matching area in some past (for forward prediction) or future (for backward prediction), already encoded, picture. For each picture of the input video there is a field of motion vectors that correspond to the coding units of that picture.

Figure 5:
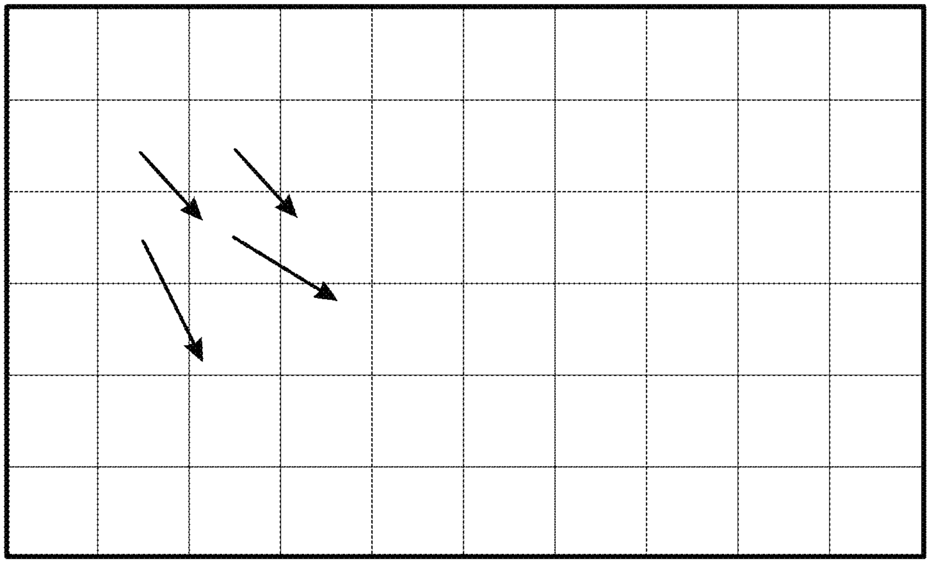
FIG. 5 is a schematic diagram illustrating reproduction of motion vectors.
Figure 5:
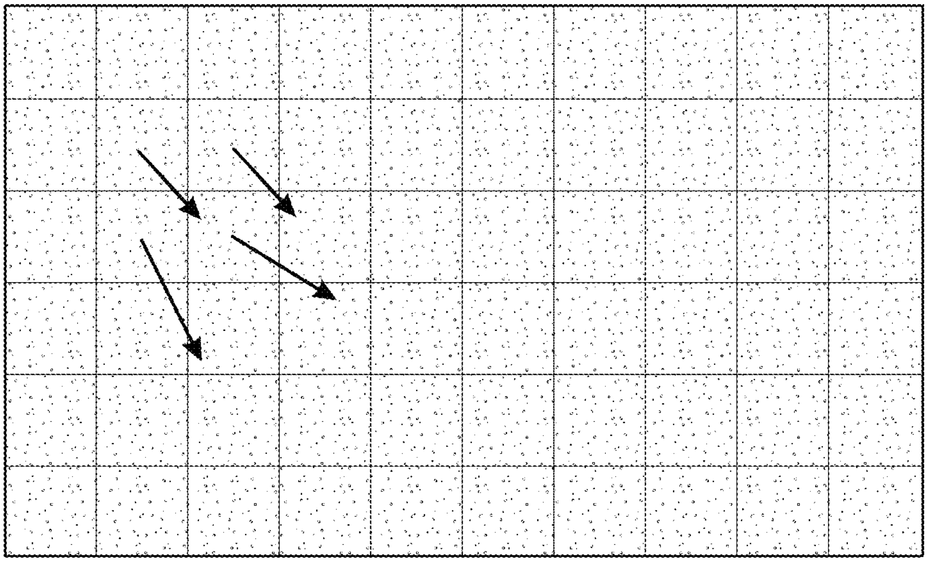

Once the complete picture is processed and all motion vectors are calculated, those vectors can be transferred to the feature representation picture and used by the video encoder that encodes feature maps. In the case where the size and resolution of the feature picture is same as the size and resolution of the video picture, the motion vectors can be copied for use in the feature representation, as depicted in FIG. 5.

Figure 6:
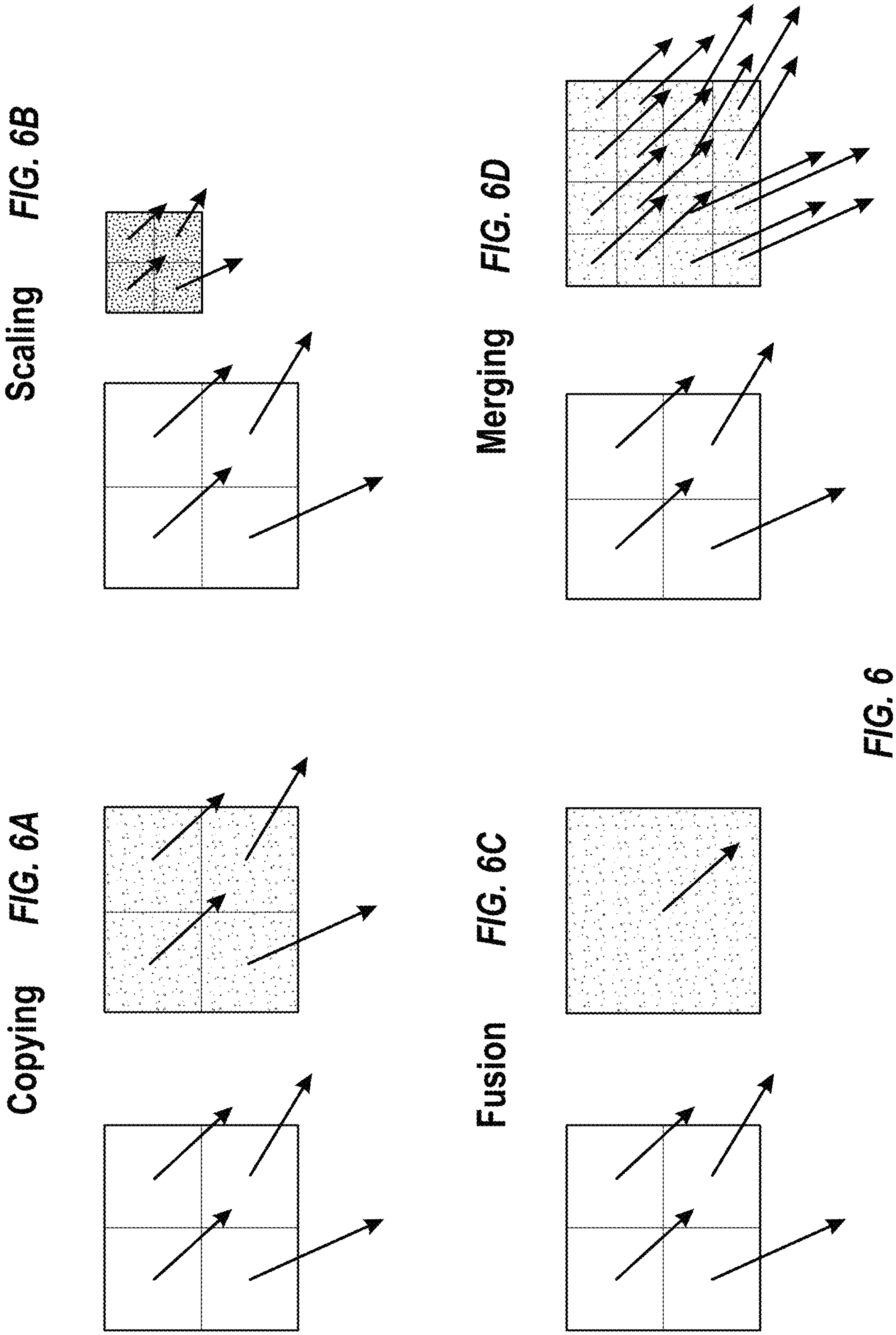

Referring to FIGS. 6A-6D, simplified examples depicting only four motion vectors for four arbitrary coding units are provided for the sake of space and brevity. In these examples, the coding units are depicted on the left and that convolution units are on the right and shaded. In many cases, it is apparent that the coding units do not align with the convolutional units, either because the resolution of the feature picture is smaller (usually downsampled by a factor f 2 or 4), or because the boundaries of the units do not align. In general, there four transformations that are typically applied to motion vectors to transfer the motion information in the coding units to the feature picture in the convolution units: (1) Copying—FIG. 6A illustrates the case where the coding units align with the convolutional units; (2) Scaling—FIG. 6B illustrates cases where the feature picture has dimensions that are proportional to the full resolution picture (e.g., half width and half height, or quarter width and quarter height). In general, those cases where a scaling factor is constant for width and height; (3) Fusion—FIG. 6C illustrates the case where one convolutional unit is collocated with multiple coding units; (4) Merging—FIG. 6D illustrates a case where multiple convolutional units are collocated with a single coding unit.

For copying, as illustrated in FIG. 6A, the motion vector of each convolutional unit is identical to the motion vector of the matching coding unit, MV'(x',y')=MV(x,y), where x is horizontal and y is vertical displacement of the motion vector MV.

For scaling, as illustrated in FIG. 6B, the motion vector is transferred as MV'(x',y')=MV(x/s,y/s), where s is a scaling constant (for example, s=2 for half-size feature picture).

For fusion, illustrated in FIG. 6C, a single motion vector is calculated based on the multiple motion vectors that are associated with the coding units that are collocated with the current convolutional unit. There are four operations that can be used to calculate the resulting vector: (1) Mode fusion: the most common vector is copied, at least two original vectors have to be identical to be considered as most common; (2) Mean fusion: a linear combination of all the original motion vectors where each component of the vector is equal to the mean of the corresponding component in the original vectors: MV'(x',y'), where $x'=(x_1+x_2+ \ldots +x_n)/n$ and $y'=(y_1+y_2+ \ldots +y_n)/n$. (3) Weighed mean fusion: a linear combination of the weighed original motion vectors, where each vector is multiplied by the reciprocal of the resulting residual after the motion compensation. For each vector MV(x,y), the components are multiplied by the 1/r, where r is the mean-absolute-difference (MAD), mean-squared-difference (MSD), or some other measure of pixel-wise difference between the original prediction unit and the motion-compensated prediction unit. (4) Cost-adapted weighed mean fusion: same as the weighed mean fusion with added factor of the reciprocal of the motion vector length. The motion vectors are penalized when the cost of encoding such motion vectors is higher than shorter motion vectors. For each MV(x,y), the components are first multiplied by 1/r and then multiplied by 1/m, where m is the cost of encoding the motion vector.

For merging, illustrated in FIG. 6D, the original vector is copied to all the collocated convolutional units. In essence, the neighboring, collocated convolutional units are sharing the identical motion vectors and can be encoded using the merge mode of the video coding, where only the first motion vector is transmitted, and the rest are indicated as identical to it. This method reduces redundancy in the joint video-feature encoder and greatly improves efficiency of such system.

Decoder-Side:

Besides significant benefits for the encoding process, the proposed method can be utilized to reduce the complexity on the decoder side as well, including the standard-compliant encoders for standards such as the versatile Video Coding (VVC) and High Efficiency Video Coding (HEVC).

Only a single instance of the motion information (motion vectors) needs to be encoded into the bitstream. In cases where the human user and machine user are not sharing the decoder, this information needs to be transmitted twice (once for the human user's decoder, and once for the machine's decoder). However, in the cases where single decoder is used, as depicted in FIG. 1, a decoder can decode fully the feature stream by using the shared motion information, after applying the transfer transformations. Thus, in this case, the feature sub-stream only needs the motion transformation payload, which is much smaller than the full motion information (motion vectors).

Figure 7:
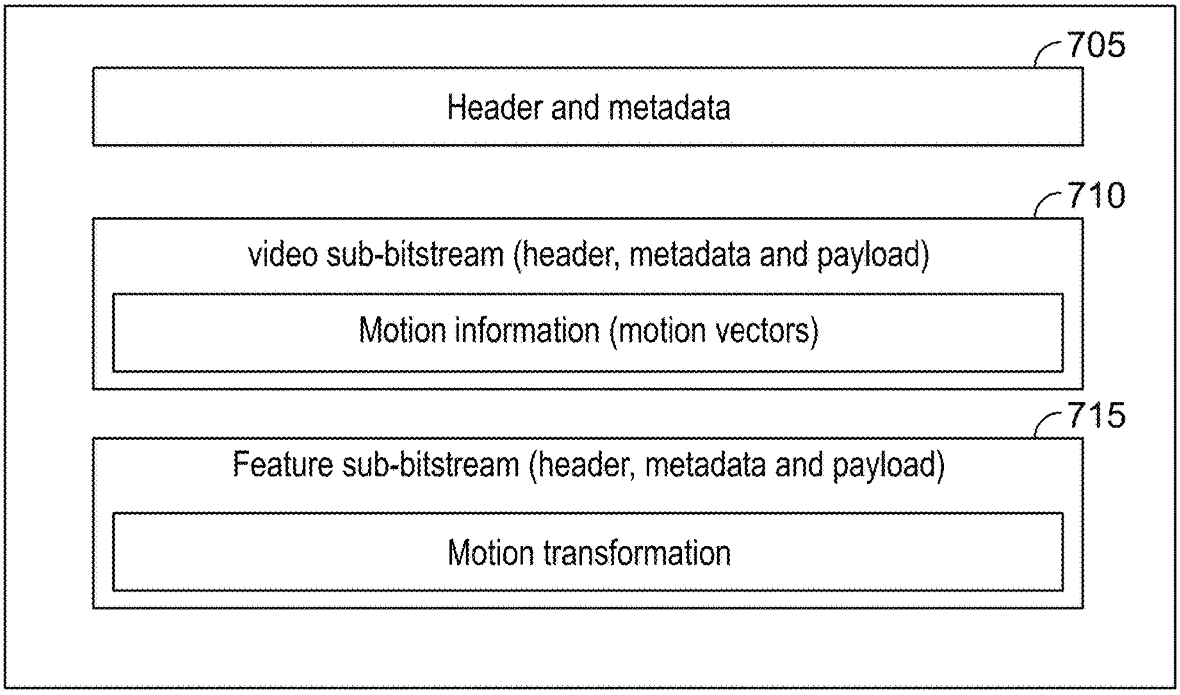
FIG. 7 is an exemplary illustration of a bitstream of a proposed encoder-decoder system.

FIG. 7 is a schematic diagram of a bitstream architecture for conveying a motion transformation payload that is generally standard-compliant with video encoding standards, such as VVC and HEVC. The bitstream may include header and metadata 705 associated with the entire bitstream. The bitstream preferably further includes video sub-stream 710 and feature sub-bitstream 715. The video sub-bitstream 710 typically includes header information, metadata, and the video payload. Included in the video payload is the motion information, typically in the form of motion vectors. The feature sub-bitstream generally includes header, metadata and feature payload. The feature payload includes the motion transformation information mapping the motion vectors in the video space to the feature space, as described above.

A further embodiment of the present disclosure provides a mechanism by which the decoder makes decisions regarding the operation of the motion vector refinement based on the information received from the feature decoder. An example of this method relates to decoder-side motion vector refinement (DMVR), such as used in VVC for example, and is generally referred to herein a feature-based decoder-side motion-vector refinement control (FDMVRC).

The present method improves the decoder process in two primary ways: (1) Decreasing of decoding complexity for the portions of the video that does not contain content of high significance, which can lead to energy saving and improved decoder speed; and (2) Increasing of the quality of the reconstructed video for the portions of the video that are deemed significant based on the features. The application of the proposed method is not limited to DMVR but can be applied to other operations of the decoder.

Implicit Signaling:

In the implicit mode, the bitstream of the VCM is same as for the system that does not use FDMVRC. The video decoder receives and parses the video bitstream with the header parameters that control the DMVR process, however it can override the parsed parameters based on the information received from the feature decoder.

For example, if the bitstream is standard-compliant with the Versatile Video Coding (VVC) standard, for a given coding unit (CU) that has the parameter "dmvr_enabled_flag" set to 0, if the corresponding, co-located feature unit (FU) contains detection of the object of interest, or region of interest, or any other portion of the video that is deemed significant, the decoder overrides the parameter value and sets it to value 1. On the other hand, for the CUs that have the value "dmvr_enabled_flag" set to 1, but do not correspond to the significant FUs, the decoder might override the value from 1 to 0.

Explicit Signaling:

In the explicit mode, the method can be applied to the systems that use a modified bitstream structure and appropriately modified video decoder. The new video bitstream preferably contains one or more parameter(s) in the sequence parameter set (SPS) that enables FDMVRC. An example of a suitable parameter is described as follows:

| | Descriptor |
|---|---|
| seq_parameter_set_rbsp( ) { | |
| if( sps_dmvr_enabled_flag) | |
| sps_fdmvr_control_present_in_ph_flag | u(1) |
| } | |

The parameter "sps_fdmvr_control_present_in_ph_flag" equal to 1 specifies that "ph_fdmvr_disabled_flag" could be present in the picture header (PH) syntax structures referring to the SPS. "sps_fdmvr_control_present_in_ph_flag" equal to 0 specifies that "ph_fdmvr_disabled_flag" is not present in PH syntax structures referring to the SPS. When not present, the value of "sps_fdmvr_control_present_in_ph_flag" is inferred to be equal to 0.

| | |
|---|---|
| if (sps_fdmvr_control_present_in_ph_flag) | |
| ph_dmvr_disabled_flag | u(1) |

As defined in the VVC standard, ph_dmvr_disabled_flag equal to 1 specifies that the decoder motion vector refinement based inter bi-prediction is disabled for the current picture. Similarly, ph_dmvr_disabled_flag equal to 0 specifies that the decoder motion vector refinement based inter bi-prediction is enabled for the current picture.

When "sps_fdmvr_control_present_in_ph_flag" is enabled, the decoder uses the information from the feature decoder to enable or disable the DMVR for a current picture or a coding unit.

An illustrative example is provided in FIGS. 3B and 3C. The input picture illustrated in FIG. 3A contains objects of interest (a person and a car). Feature decoder decodes the feature stream that contains picture and annotated objects with boundaries. The information about the object location is passed to the video decoder in the form of pixel positions, which can be represented as (x,y) pairs for each pixel, or more coarsely (x,y,w,h) tuples that give coordinates of the top left corner and the width and height in pixels of the bounding box or the feature unit. It will be appreciated that other methods to represent an object may be employed, such as the coordinates of diagonally opposing corners in a rectangular bounding box. After receiving this information, video decoder can assign appropriate FDMVRC values for each coding unit (CU). In FIG. 3C, the picture is divided into CUs where dark shaded CUs contain parts or whole objects of interest. For those CUs the decoder can turn on FDMVRC, while for all other CUs it can turn off FDMVRC.

Figure 8:
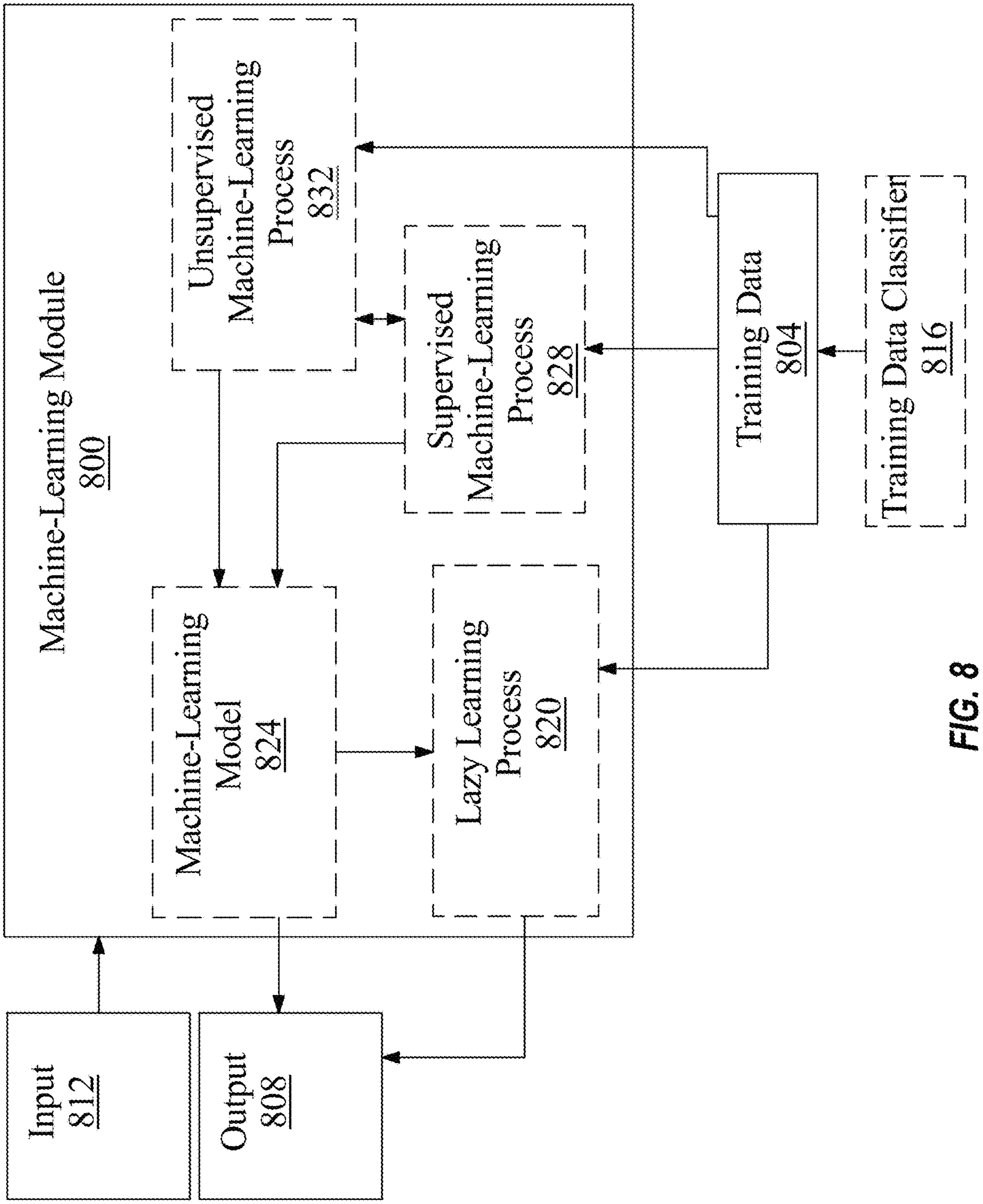
FIG. 8 is a block diagram illustrating an exemplary embodiment of a machine-learning module.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a process whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task clastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
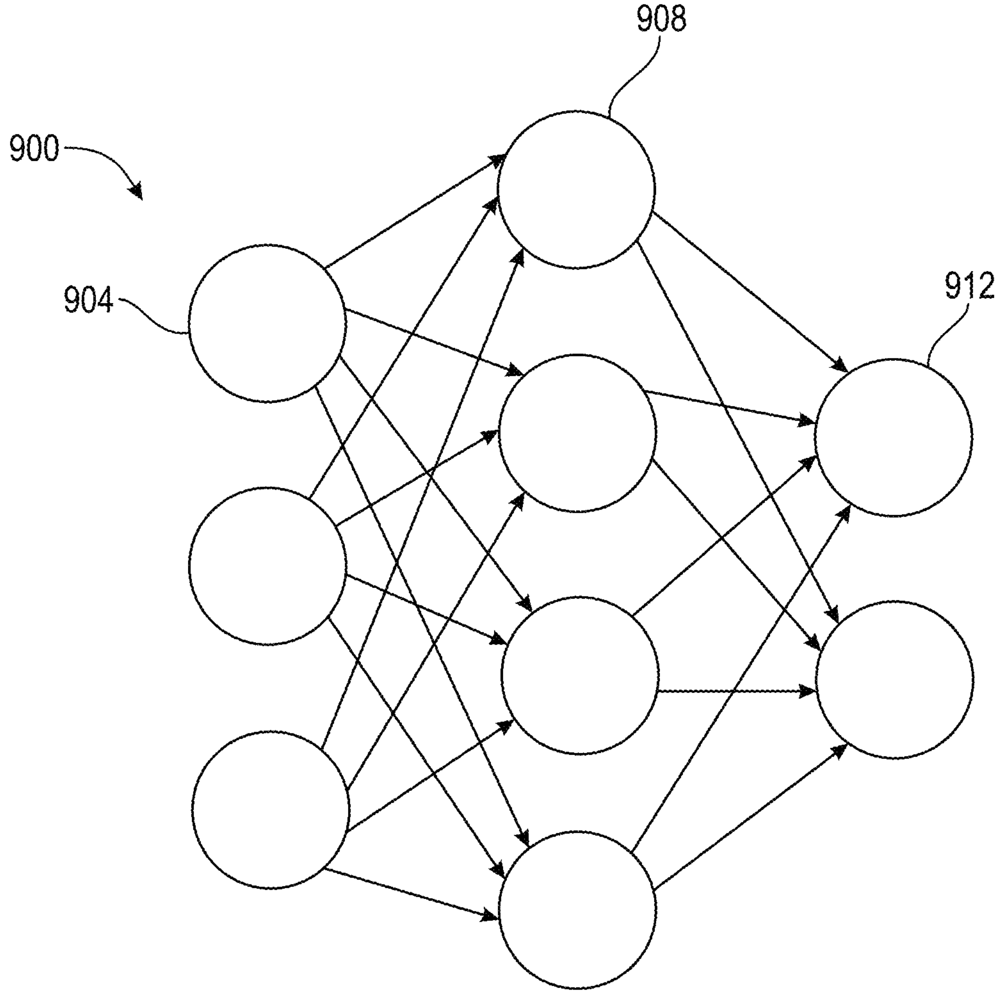
FIG. 9 is a schematic diagram illustrating an exemplary embodiment of neural network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 10:
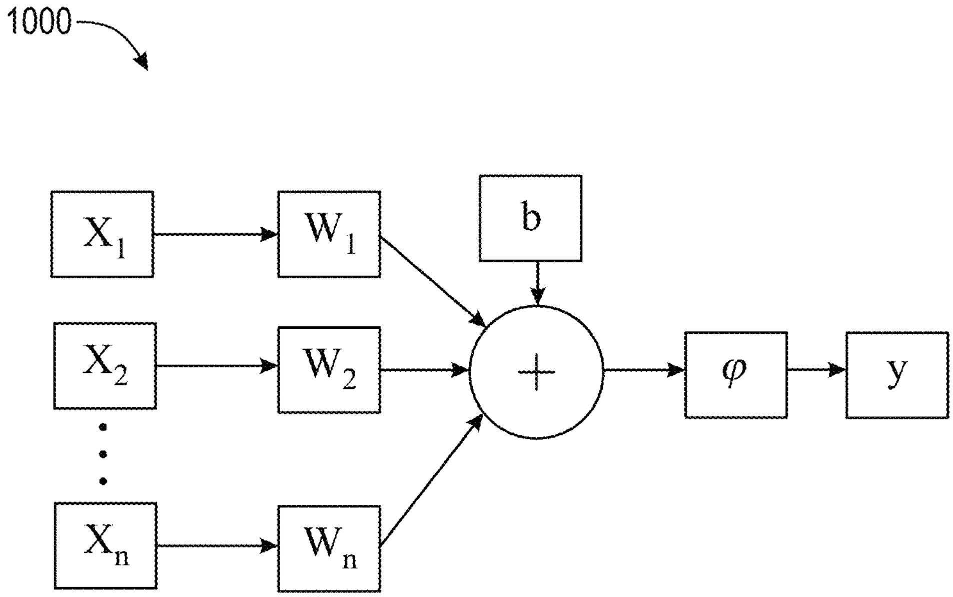
FIG. 10 is a schematic diagram illustrating an exemplary embodiment of a node of a neural network

Referring now to FIG. 10, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 10, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Figure 11:
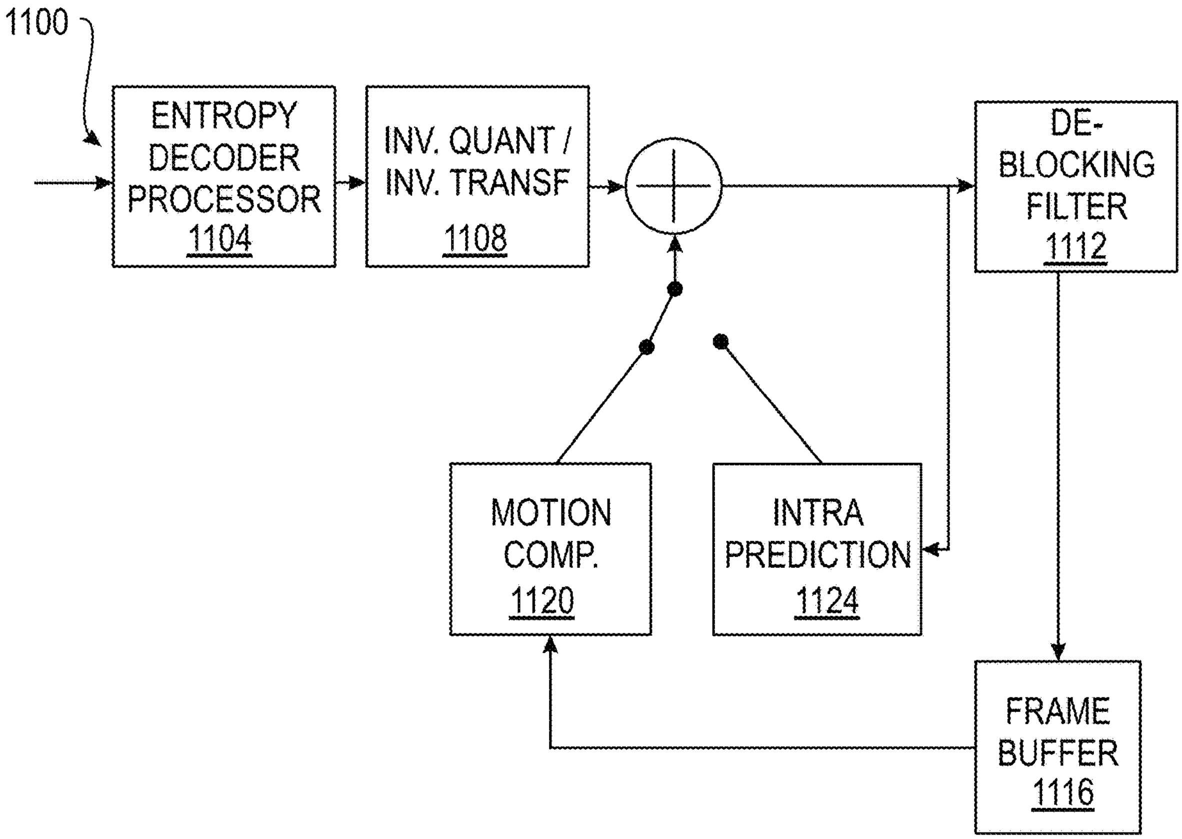
FIG. 11 is a block diagram illustrating an exemplary embodiment of a video decoder.

FIG. 11 is a system block diagram illustrating an example decoder 1100 capable of adaptive cropping. Decoder 1100 may include an entropy decoder processor 1104, an inverse quantization and inverse transformation processor 1108, a deblocking filter 1112, a frame buffer 1116, a motion compensation processor 1120 and/or an intra prediction processor 1124.

In operation, and still referring to FIG. 11, bit stream 1128 may be received by decoder 1100 and input to entropy decoder processor 1104, which may entropy decode portions of bit stream into quantized coefficients. Quantized coefficients may be provided to inverse quantization and inverse transformation processor 1108, which may perform inverse quantization and inverse transformation to create a residual signal, which may be added to an output of motion compensation processor 1120 or intra prediction processor 1124 according to a processing mode. An output of the motion compensation processor 1120 and intra prediction processor 1124 may include a block prediction based on a previously decoded block. A sum of prediction and residual may be processed by deblocking filter 1112 and stored in a frame buffer 1116.

In an embodiment, and still referring to FIG. 11 decoder 1100 may include circuitry configured to implement any operations as described above in any embodiment as described above, in any order and with any degree of repetition. For instance, decoder 1100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 12:
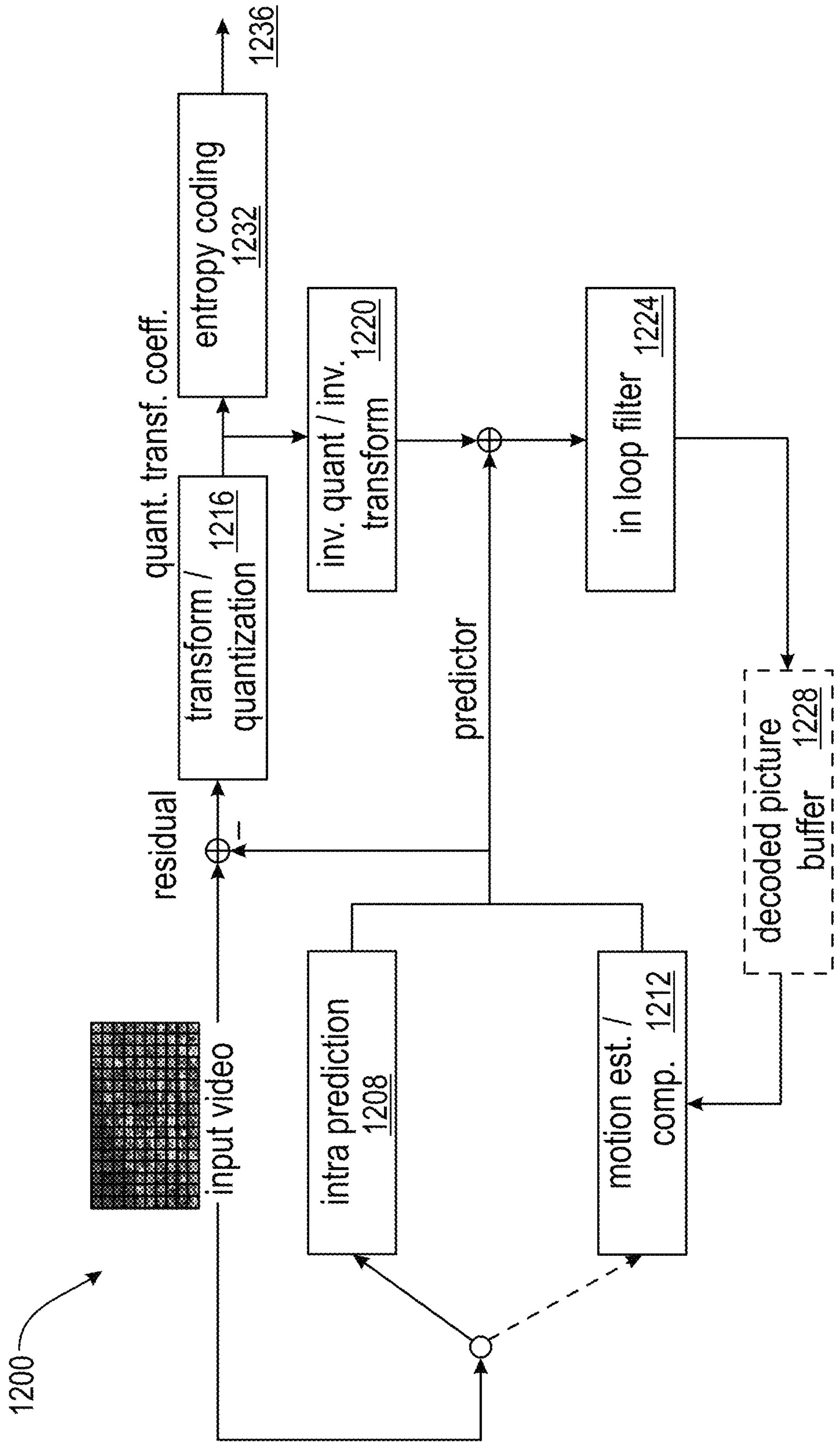
FIG. 12 is a block diagram illustrating an exemplary embodiment of a video encoder.

FIG. 12 is a system block diagram illustrating an example video encoder 1200 capable of adaptive cropping. Example video encoder 1200 may receive an input video 1204, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 12, example video encoder 1200 may include an intra prediction processor 1208, a motion estimation/compensation processor 1212, which may also be referred to as an inter prediction processor, capable of constructing a motion vector candidate list including adding a global motion vector candidate to the motion vector candidate list, a transform/quantization processor 1216, an inverse quantization/inverse transform processor 1220, an in-loop filter 1224, a decoded picture buffer 1228, and/or an entropy coding processor 1232. Bit stream parameters may be input to the entropy coding processor 1232 for inclusion in the output bit stream 1236.

In operation, and with continued reference to FIG. 12, for each block of a frame of input video, whether to process block via intra picture prediction or using motion estimation/compensation may be determined. Block may be provided to intra prediction processor 1208 or motion estimation/compensation processor 1212. If block is to be processed via intra prediction, intra prediction processor 1208 may perform processing to output a predictor. If block is to be processed via motion estimation/compensation, motion estimation/compensation processor 1212 may perform processing including constructing a motion vector candidate list including adding a global motion vector candidate to the motion vector candidate list, if applicable.

Further referring to FIG. 12, a residual may be formed by subtracting a predictor from input video. Residual may be received by transform/quantization processor 1216, which may perform transformation processing (e.g., discrete cosine transform (DCT)) to produce coefficients, which may be quantized. Quantized coefficients and any associated signaling information may be provided to entropy coding processor 1232 for entropy encoding and inclusion in output bit stream 1236. Entropy encoding processor 1232 may support encoding of signaling information related to encoding a current block. In addition, quantized coefficients may be provided to inverse quantization/inverse transformation processor 1220, which may reproduce pixels, which may be combined with a predictor and processed by in loop filter 1224, an output of which may be stored in decoded picture buffer 1228 for use by motion estimation/compensation processor 1212 that is capable of constructing a motion vector candidate list including adding a global motion vector candidate to the motion vector candidate list.

With continued reference to FIG. 12, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 12, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 12, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 12, encoder 1200 may include circuitry configured to implement any operations as described above in any embodiment, in any order and with any degree of repetition. For instance, encoder 1200 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1200 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 12, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 1200 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
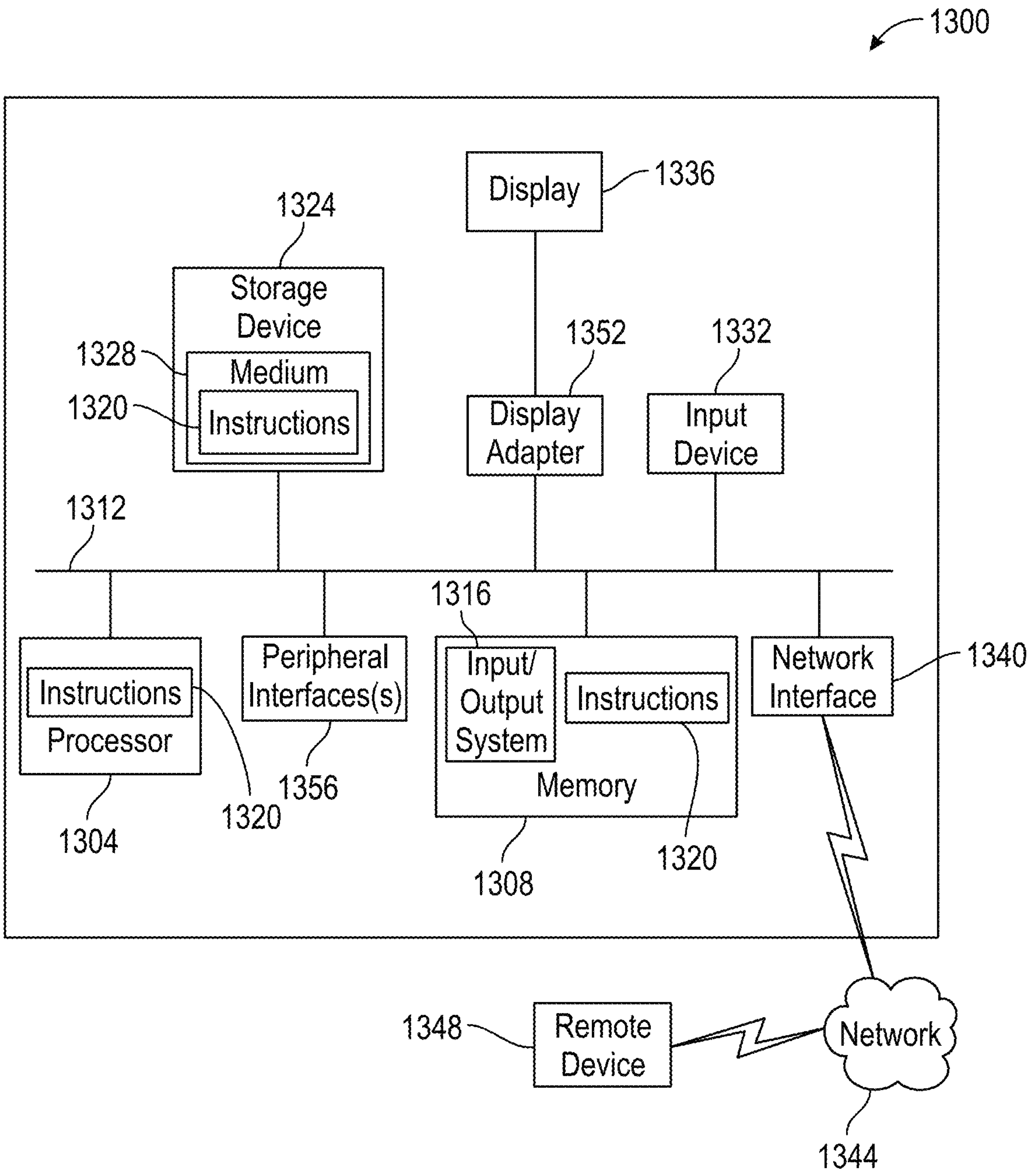
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of encoding video content with feature information, comprising:

determine motion information for each coding unit comprising the video content;

produce a feature map for the video content, the feature map having a plurality of convolution units with a correspondence to the convolution units;

using a transformation selected based on the correspondence of the convolution units to the coding units, generate motion transformation information by mapping the motion information of the video content in each coding unit to at least one corresponding convolution unit; and generate an encoded bitstream including the video content, the motion information, and the motion transformation information.

2. The method of claim 1, wherein the coding units correspond to the convolution units in size and number and wherein the transformation copies the motion information from each coding unit to a corresponding convolution unit.

3. The method of claim 1, wherein the coding units correspond to the convolution units in number but differ in size and wherein the transformation scales the motion information from each coding unit to a corresponding convolution unit.

4. The method of claim 1, wherein multiple coding units correspond to a single convolution unit and wherein the transformation fuses the motion information of the multiple coding units to map the motion to the convolution unit.

5. The method of claim 1, wherein each coding unit corresponds to multiple convolution units and wherein the transformation merges the motion information from a coding unit to the multiple convolution units.

6. The method of claim 1, wherein the transformation is selected from a group including copying, scaling, fusing and merging.

7. The method of claim 1, wherein the bitstream comprises:

header and metadata for the entire content;

a video sub-bitstream including header, metadata, video payload information including motion information; and a feature sub-bitstream including header, metadata and feature payload information including motion transform information.

* * * * *